Figure 1:
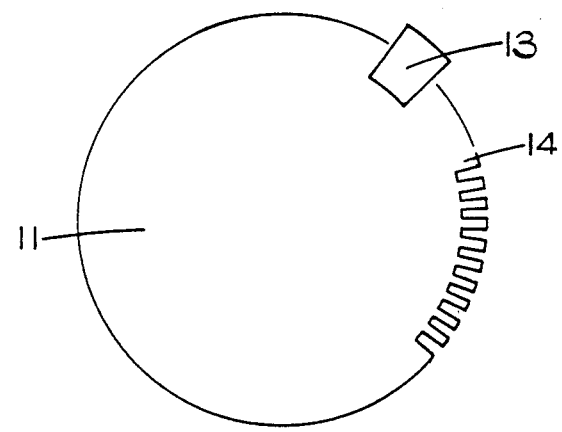
Figure 1:
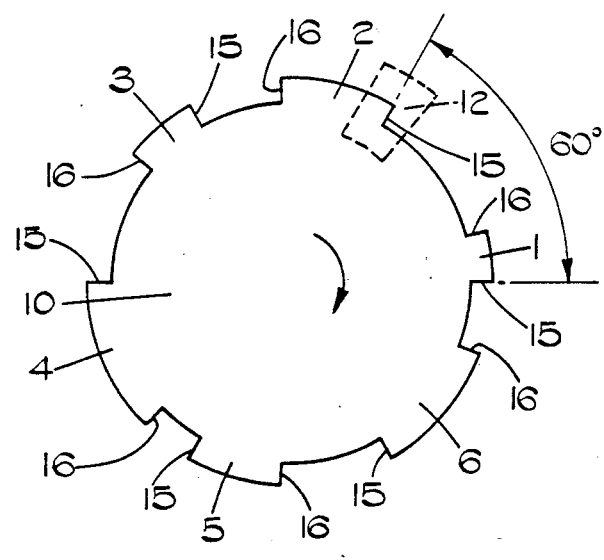

United States Patent [19]

Francis et al.

[11] Patent Number: 4,558,591

[45] Date of Patent: Dec. 17, 1985

[54] ENGINE POSITION TRANSDUCER MEANS

[75] Inventors: John H. Francis, Cheltenham; Nigel A. Deller; Clive I. Perkins, both of Cirencester, all of England

[73] Assignee: Lucas Industries public limited company, Birmingham, England

[21] Appl. No.: 639,146

[22] Filed: Aug. 9, 1984

[30] Foreign Application Priority Data

Aug. 25, 1983 [GB] United Kingdom ............... 8322886

[51] Int. Cl.$^4$ ........................................... G01M 15/00
[52] U.S. Cl. ................................................. 73/116
[58] Field of Search .................. 73/116, 117.3, 119 A; 250/231 SE, 233; 123/613, 617

[56] References Cited

U.S. PATENT DOCUMENTS 4,158,305  6/1979  Shipley ............................. 73/119 A
4,233,592 11/1980  Leichle ..................... 250/231 SE X Primary Examiner—Jerry W. Myracle

[57] ABSTRACT

An engine position transducer device includes first and second discs adapted to be coupled to a rotary part of an engine. The first disc has a plurality of vanes equal in number to the number of engine cylinders. The leading edges of the vanes are equi-angularly spaced about the axis of the disc but the trailing edges are arranged so that each vane has a different length. The disc has a larger number of equally spaced marks 14. Transducers are associated with the discs and a signal processing device is provided which counts the number of marks on the second disc which pass the associated transducer while a vane on the first disc is passing the associated disc. The processing device contains stored information and can compare the count values with the stored information to provide a recognition signal. In addition the processing device is able to determine whether or not the engine is rotating in the correct direction.

4 Claims, 5 Drawing Figures

ENGINE POSITION TRANSDUCER MEANS

This invention relates to transducer means for providing an indication of the angular position of an engine crankshaft.

In a fuel injection system for a multi-cylinder internal combustion engine of the type in which fuel is injected directly into the engine cylinders, it is necessary to ensure that fuel is delivered to the engine cylinders at the correct time that is to say at some time during the compression strokes of the individual cylinders. The injection of fuel is effected by changing the state of an electromagnetic device or devices which is/are controlled by an electronic control system. The control system needs to know the position of the engine in order that fuel can be delivered by the appropriate nozzle at the correct time.

A transducer means is known in which a disc is rotated at half engine speed by the cam shaft of the engine. It is known to provide on this disc a single mark and to sense the passage of this mark by means of a transducer so that the transducer provides a signal which corresponds to a particular position of the engine for example when the piston of number one cylinder of the engine is at bottom dead centre prior to the compression stroke. Also provided is another disc and transducer which produces a larger number of signals at equal intervals during rotation of the engine and it is possible to determine the engine position to the required degree of accuracy. In some transducer means the first mentioned disc has as many marks on it as there are engine cylinders, plus one further mark, the further mark being positioned close to one of the other marks and again serving as an identification mark. With such an arrangement it is possible for the mark or the further mark to have just passed the transducer when the engine is stopped. This means that before a positive indication can be obtained of the engine position, the engine must be cranked through almost two revolutions. During such time the supply of fuel to the engine must be prevented and the cranking time required before the engine can start is therefore extended as compared with a mechanical system.

The object of the present invention is to provide a transducer means for the purpose specified in a simple and convenient form.

According to the invention a transducer means for the purpose specified comprises a first disc and a first transducer associated therewith, said first disc being driven in use by the engine, a first series of means equal in number to the number of engine cylinders, on the disc whereby said first transducer produces signals at regular intervals during rotation of the engine, and a second series of means on the disc, the means of the second series being alternately arranged with the means of the first series, the angular intervals between the means of the second series and the following means of the first series being unequal, a second disc and a second transducer associated therewith for producing signals at equal angular intervals during rotation of the engine, and signal processing means which receives said signals and compares the number of signals produced by said second transducer in the intervals between the signals provided by said first transducer, with a stored record to establish the position of the engine.

Figure 2:
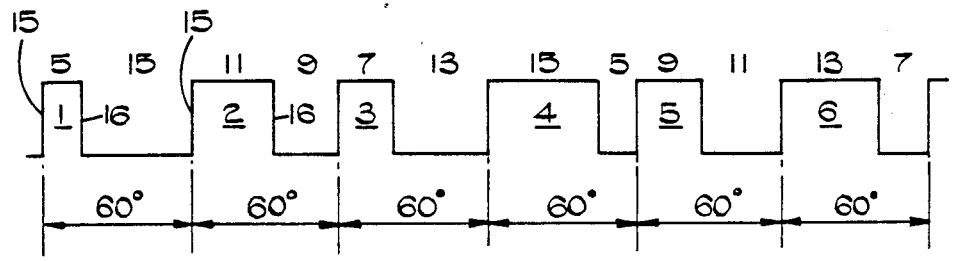
Figure 3:
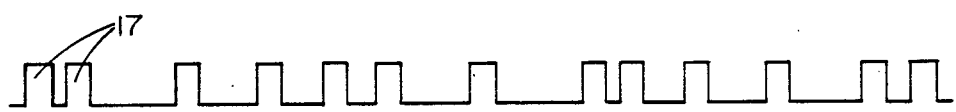
Figure 4:
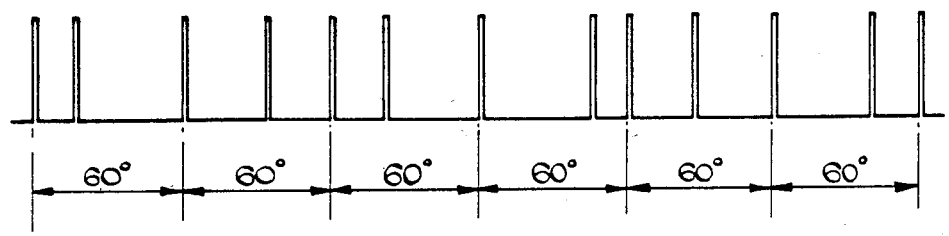
Figure 5:
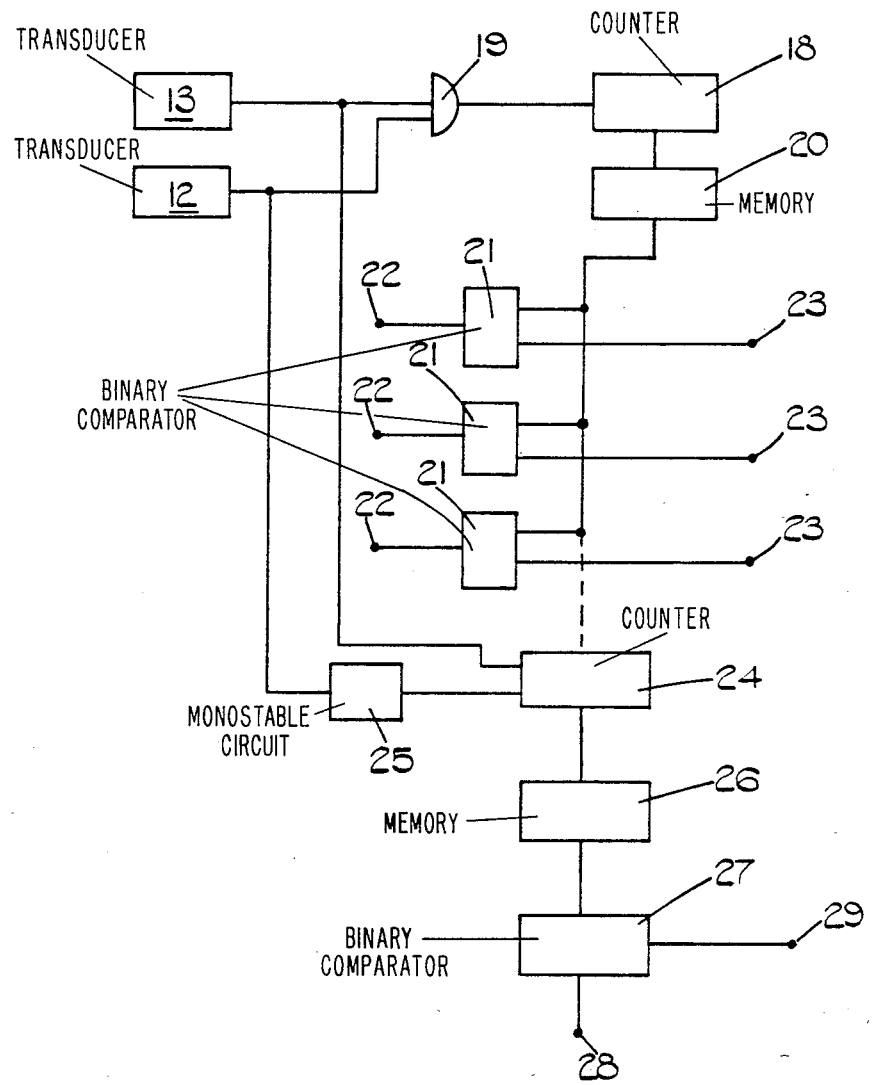

Examples of transducer means in accordance with the invention will now be described with reference to the accompanying drawings in which:

FIG. 1 illustrates the profile of two discs forming part of the transducer means, FIG. 2 is a developed view of the profile of one of the aforesaid discs, FIG. 3 is a view of the profile of another form of disc, FIG. 4 is a pulse diagram of the signals obtained from a transducer associated with one of the discs, and FIG. 5 is a block diagram of a signal processing means.

Referring to FIG. 1 of the drawings, the transducer means comprises a vaned disc 10 and a toothed disc or wheel 11. Associated with the discs are first and second transducers 12, 13. The disc 10 is driven by the cam shaft of the associated engine and therefore in the case of a four stroke engine, rotates at half engine speed. The disc 11 may be driven either by the cam shaft or by the crankshaft of the engine. In the case where it is driven by the crankshaft of the engine, it will have half the number of teeth 14 forming its peripheral surface. Conveniently the transducer 12 is a Hall Effect vane switch, and transducer 13 is a reluctance probe. The movement of the vanes between the sensing portions of the transducer 12 cause output signals to be generated corresponding to the edges of the vanes and the movement of the teeth causes the transducer 13 to produce output signals corresponding to the center lines of the teeth.

The disc 10 has a first and a second series of means formed on it, each "means" is formed by the edge of a vane and in the particular example it will be seen that there are six vanes, numbered 1-6, the disc being intended for use with a six cylinder engine. Each vane has a leading edge 15, the leading edges defining a first series of means. The leading edges of the vanes are spaced angularly at regular intervals, in the particular example 60°. The edges 15 therefore when they pass through the transducer, will produce a series of signals at regular intervals. The trailing edges 16 of the vanes constitute a second series of means and it will be noted that the spacing of the trailing edges from the adjacent leading edges of the vanes is unequal. It is convenient to consider the spacing between the leading edges and trailing edges of the vanes in terms of the number of pulses produced by the teeth 14 on the disc 11. In the particular example the disc 11 is provided with 120 teeth, the disc 11 is driven by the cam shaft and the signals provided by the transducer 13 are processed so that signals are only produced when the center lines of the teeth pass the transducer. In one revolution of the disc 11 therefore 120 signals will be produced with 60° being represented by 20 signals.

Turning now to FIG. 2, between the leading edges 15 of the vanes on the disc 10 there will be a total of 20 signals produced by the transducer 13. However, the vanes are of unequal length and between the signals produced at 60° intervals a further series of signals will be produced at intervals which vary in accordance with the circumferential length of each vane. From the left hand end of FIG. 2, the first vane 1 has a circumferential length equivalent to 5 signals from the disc 11 and the interval between the trailing face 16 of the vane and the leading face of the next vane 2 is such that 15 signals are produced by the disc 11. The vane 2 has a circumferential length such that 11 signals are obtained from the disc 11 before the trailing edge passes the transducer, and so on. It will be noted that the signal pattern between the signals produced by the leading edges of adjacent vanes is individual to a particular vane and hence it is possible by comparing the signals with a stored pattern, to determine the position of the crankshaft of the engine after it has been rotated through 60°. This applies only if it is certain that the crankshaft is rotating in the correct direction. It is necessary to ensure that the crankshaft is turning in the correct direction and in order to do this the crankshaft must be allowed to rotate through at least 60° in the particular example. In the example, the transition between low and high when the disc 10 and engine are turning in the correct direction occurs every 60° and is caused by the leading edges 15 of the vanes. If the disc and engine are rotating in the opposite direction the above transitions between low and high will be due to the so-called trailing edges of the vanes and will be spaced by an angle other than 60° in some cases more than 60° and in other cases less than 60°. It is possible therefore to identify that the engine is rotating in the wrong direction.

In the modification shown in FIG. 3 the vanes of the disc 10 are replaced by teeth 17 there being teeth positioned to correspond with the leading and trailing edges of each vane.

The signal provided by the transducer 12 occurs at the midpoint of each tooth. FIG. 4 shows the waveform produced by the transducers 12 in each case.

The signals provided by the transducer 12 and 13 can be processed in a microprocessor which contains stored information relative to the pulse sequence which occurs when the crankshaft is rotating in the correct direction. Alternatively a logic circuit may be employed which includes binary comparators which are provided with inputs representing the pulse pattern for the individual cylinders of the engine respectively.

An example of a suitable logic circuit is seen in FIG. 5 wherein a counter 18 receives the outputs of the transducers 12, 13 by way of an AND gate 19. The count value in the counter before it is reset represents the number of teeth 14 passing the transducer 13 during the passage of a vane past the transducer 12. The count value is stored in a memory 20 and is supplied to a plurality of binary comparators 21 equal in number to the number of engine cylinders only three comparators being shown in FIG. 5. Each comparator 21 is supplied with the count value stored in the memory 20 and also by way of an input terminal 22 with the count value appropriate to a particular engine cylinder. When the engine is rotating in the correction directon, at the output terminals 23 of the comparators there will appear identification signals, these signals appearing in the correct sequence.

In order to detect that the engine is rotating in the correct direction the output of the transducer 13 is applied to a further counter 24 the reset input of which is connected to a monostable circuit 25 controlled by the leading edges of the pulse signal provided by the transducer 12. The counter therefore counts the number of pulses generated by the transducer 13 between the leading edges of the pulse signal provided by the transducer 13. If the engine is rotating in the correct direction this value will be constant and in the particular example equal to twenty. If however the engine is rotating in the opposite direction the counter will count the number of pulses generated by the transducer 13 in the intervals between the passage of the trailing edges 16 of the vanes and this value is never equal to twenty. The count value in the counter 24 is stored in a memory 26 and applied to a single binary comparator 27 to which by way of an input terminal 28 is supplied the count value twenty. If the final count value of the counter 24 differs from twenty this is recognized by the comparator 27 and an output signal appears at output terminal 29 indicative of reverse rotation of the engine.

We claim:

1. A transducer means for providing an indication of the angular position of an engine crankshaft comprising a first disc and a first transducer associated therewith, said first disc being driven in use by the engine, a first series of means equal in number to the number of engine cylinders, on the disc whereby said first transducer produces signals at regular intervals during rotation of the engine, and a second series of means on the disc, the means of the second series being alternately arranged with the means of the first series, the angular intervals between the means of the second series and the following means of the first series being unequal, a second disc and a second transducer associated therewith for producing signals at equal angular intervals during rotation of the engine, and signal processing means which receives said signals and compares the number of signals produced by said second transducer in the intervals between the signals provided by said first transducer, with a stored record to establish the position of the engine.

2. A transducer means according to claim 1 in which said first disc is provided with a plurality of vanes equal in number to the number of engine cylinders, said first series of means comprising the leading edges of said vanes, the second series of means being defined by the trailing edges of said vanes.

3. A transducer means according to claim 1 in which said first disc is provided with a first series of teeth defining said first series of means and a second series of teeth defining said second series of means.

4. A transducer means according to claim 1 in which said signal processing means includes means responsive to the signals produced by said transducers for detecting reverse rotation of the engine.

* * * * *